United States Patent Office 2,945,960
Patented July 19, 1960

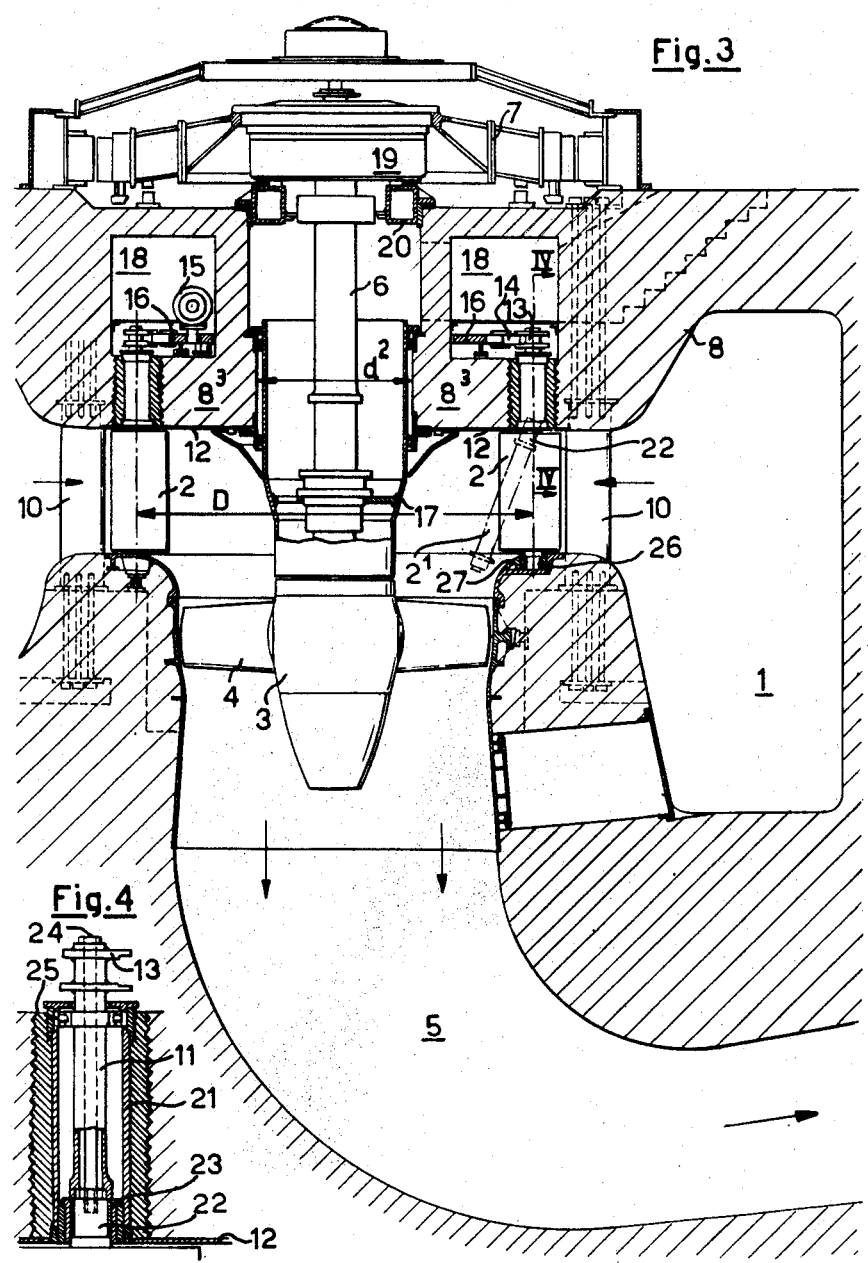

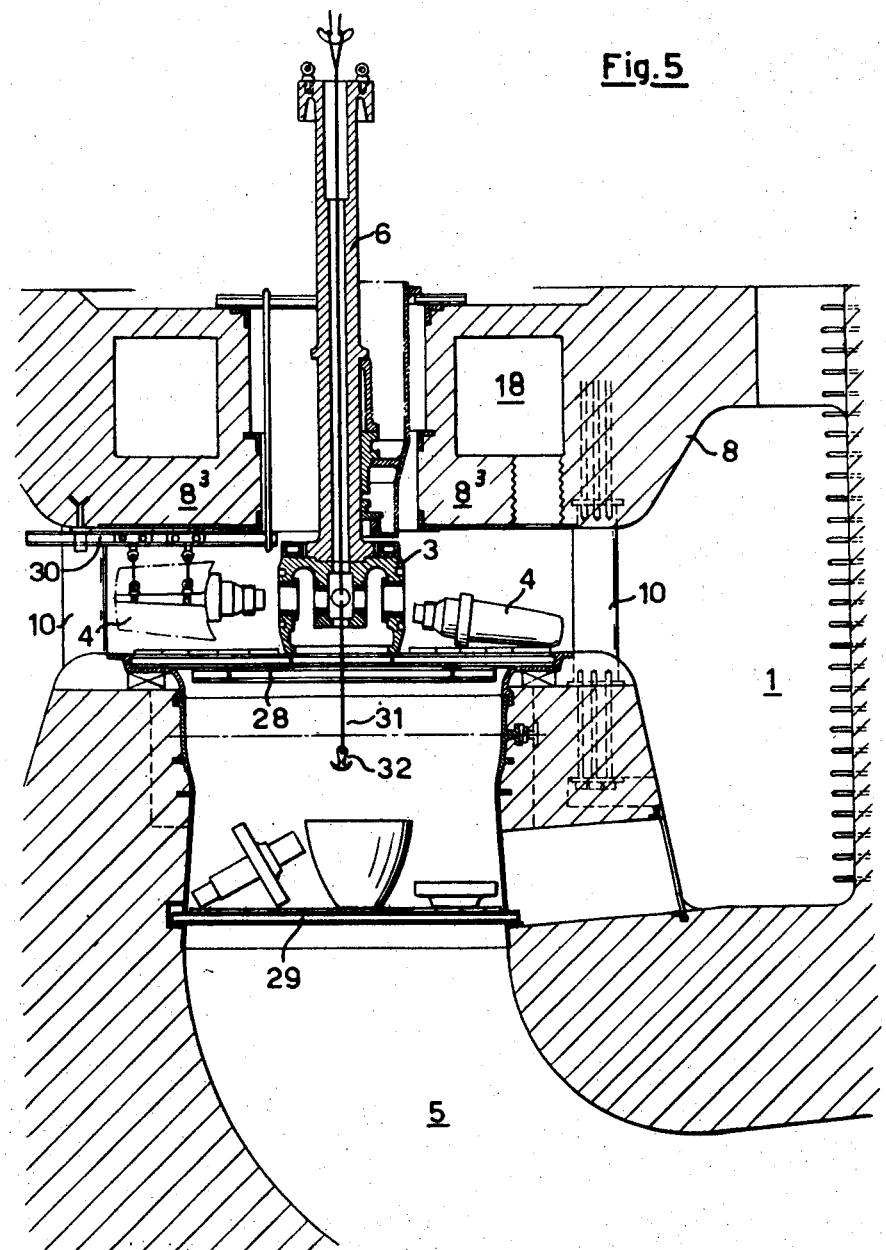

2,945,960

HYDRAULIC TURBINE PLANT HAVING A CONCRETE SPIRAL HOUSING

Heinrich Albert Obrist, Zurich, Switzerland, assignor to Escher Wyss Aktiengesellschaft, Zurich, Switzerland, a corporation of Switzerland Filed May 6, 1957, Ser. No. 657,385

Claims priority, application Switzerland May 19, 1956

5 Claims. (Cl. 290—52)

This invention relates to improvements in a hydroelectric power plant consisting of a propeller type turbine having a shaft which rotates on a vertical axis and a generator driven by said shaft, in which plant the water is fed to the turbine through a concrete spiral housing encircling said shaft and thereafter through a guide apparatus comprising guide vanes angularly adjustable about vertical axes which are spaced apart on a circle centered on the turbine axis.

In such turbines it has been usual to embed a supporting vane structure in the concrete housing in advance of the adjustable guide vanes and to close the space above the adjustable guide vanes with a cast or welded turbine cover.

The invention aims to provide a plant which is more economical to manufacture and install than these known constructions. This is achieved according to the invention in that the roof of the concrete spiral housing includes an inwardly projecting concrete collar, which defines a central opening having a smaller diameter than the diameter of the said guide vane circle.

Figures 1 to 3 of the drawing illustrate in vertical axial section three different examples of the invention.

Figure 4 is a fragmentary sectional view along the line IV—IV in Figure 3, and

Figure 5 illustrates how the runner shown in Figure 3 can be assembled.

Figure 1:
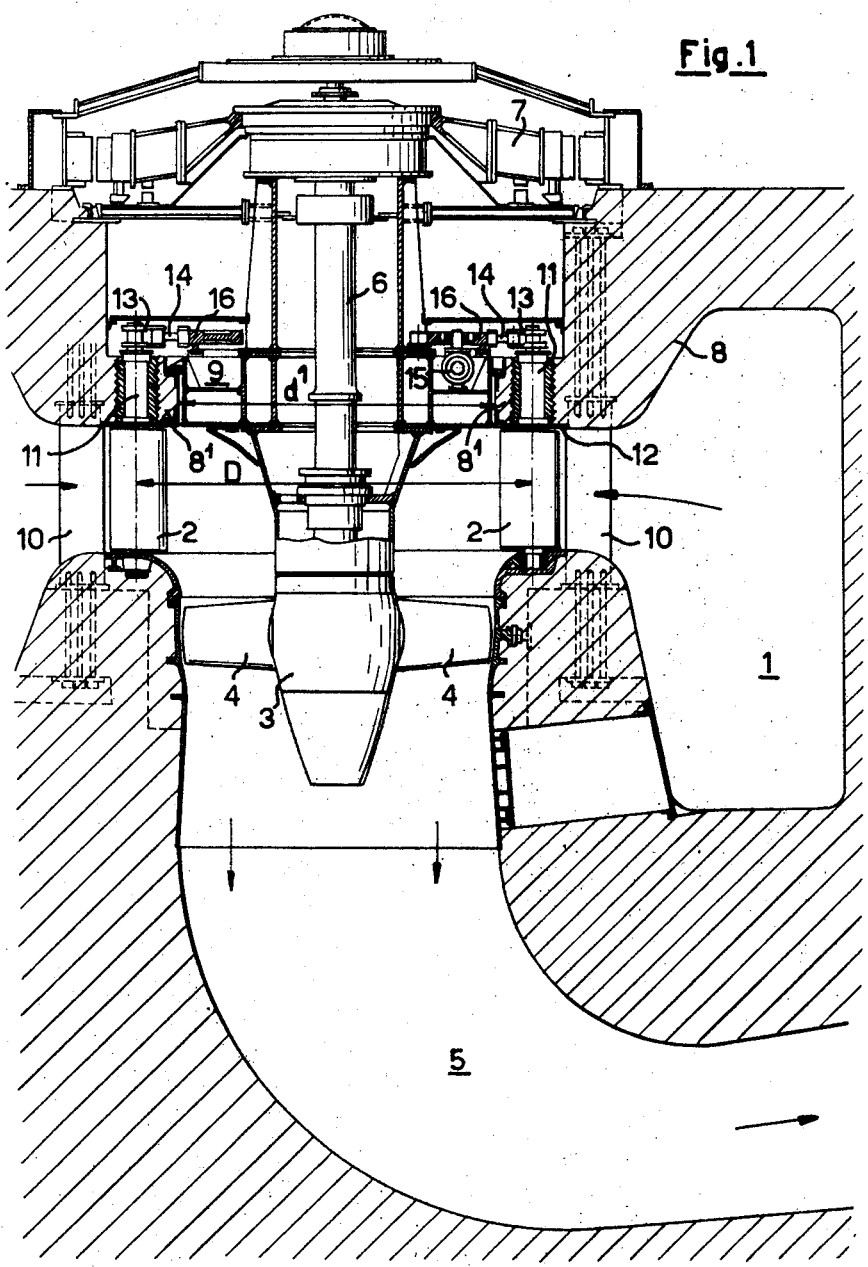

As shown in Fig. 1, a concrete housing encloses and defines a spiral inlet passage which surrounds and feeds water to an inlet guide apparatus. This includes an outer circular series of fixed secant guide vanes 10, and an inner series of secant guide vanes 2 immediately within said outer series, and angularly adjustable in unison on vertical axes. Thus supplied with a whirling stream of water by the inlet guide apparatus, is a runner comprising a hub 3 mounted on the turbine shaft 6 and carrying substantially radial vanes 4 whose pitch is adjustable. Discharge of tail water is through a curved suction pipe 5. The turbine runner is mounted for rotation about a vertical axis and drives a generator 7 through the shaft 6. The axes of the adjustable guide vanes 2 are arranged around the turbine axis in a circle having a diameter D. The roof of the concrete spiral housing is indicated at 8. It has an inwardly projecting concrete collar $8^1$ defining a central opening which, during operation of the plant, is closed by a welded turbine cover 9. The adjustable guide apparatus is encircled by the fixed supporting vane structure 10 anchored in the concrete at the top and bottom. The generator 7 is arranged above the collar $8^1$ and the shaft 6 extends through the central opening of the collar.

The water flows successively through the spiral housing 1, the supporting vane structure 10 and the guide apparatus comprising the adjustable vanes 2, whereafter it is fed as a coaxially whirling body against the upstream faces of the runner vanes 4 to cause rotation of the runner and discharges through the suction pipe 5.

The central opening which is defined by the concrete collar $8^1$ has a diameter $d^1$ which is smaller than the diameter D of the guide vane circle. However, the diameter $d^1$ is larger than the outer diameter of the runner vanes 4. When the cover 9 is removed, the central opening of the collar $8^1$ thus permits the turbine runner to be introduced from above in an assembled condition.

Holes are provided in the collar $8^1$ of the roof 8 of the spiral, through which extensions 11 of the guide-vane shafts pass. At the bottom, the collar $8^1$ is reinforced by a protecting plate 12 which protects the concrete near the guide vanes against attack by the water. The protecting cover has complementary holes for receiving the guide vane shafts. Levers 13 are attached to the shaft extensions 11. They are connected by lugs 14 to a control ring 16 actuated by a servomotor 15. In Figure 1 the control ring and servomotor are supported by the turbine cover 9.

Figure 2:
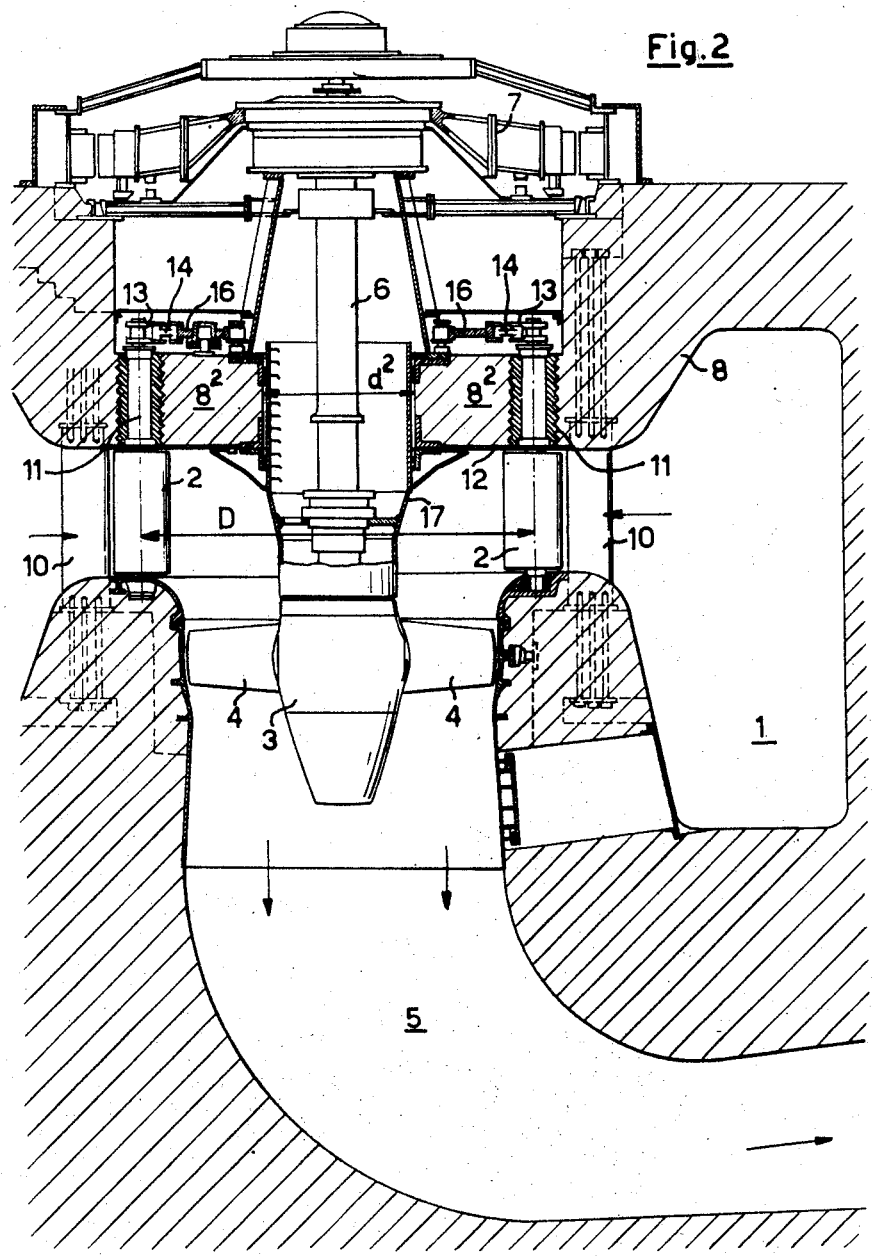

In a example of Figure 2 the concrete roof 8 comprises a collar $8^2$ defining a central opening which has a diameter $d^2$ which is smaller than the diameter D of the guide vane circle and smaller than the outside diameter of the runner vanes 4 but larger than the diameter of the runner hub 3 and larger than the longest profile length of the runner vanes 4. In this construction the runner cannot be introduced through the central opening in the concrete collar $8^2$ in an asesmbled condition. But the opening is large enough for the runner hub and the individual runner vanes to pass through. The runner must then be assembled below the roof of the spiral housing. The inwardly projecting collar $8^2$ of the concrete roof 8 must be a little higher than that in Figure 1 because of its greater projection. The control ring 16 is supported on the collar $8^2$ of the concrete spiral roof. In the assembled condition of the plant the central opening of the concrete collar $8^2$ is closed by a tubular sheet metal cover 17 extending down to the hub 3 of the runner.

In the embodiment of Figure 3, which is the preferred one, the concrete roof of the spiral housing has a collar $8^3$. The diameter of the central opening of the latter is again smaller than the diameter D of the guide vane circle and smaller than the outer diameter of the vaned runner but large enough to insert the runner hub 3 and blades 4 individually.

The collar $8^3$, however, is of box formation and defines an annular cavity 18. Within this cavity 18 there is housed the control means for the inlet guide apparatus, namely the control ring 16 and servomotor 15. Further, the thrust bearing 19 for the turbine runner is supported on the box-shaped collar $8^3$ of the concrete roof 8 by a supporting ring 20.

Figure 4 is an enlarged sectional view of the concrete roof at the point where the guide vane shafts pass through. The complementary opening in the concrete roof is covered internally with a tube 21. The upper blade-shaft is shown at 22. It is mounted in a bushing 23 arranged in the lower end of the tube 21. The extension 11 of the blade-shaft is tubular and coupled to the blade-shaft 22 by a dog such as a hexagon and at the same time is axially fastened to the blade-shaft 22 by a bolt 24. A roller bearing 25 for guiding the shaft extension is also provided at the upper end of the tube 21.

As shown in Figure 3, during assembly the blade 2 is inserted in the bearing 23 together with the upper blade-shaft 22 when it is in a position $2^1$. In order that the lower blade-shaft 26 can be brought into position, there is inserted in the sheet-metal cover of the lower portion of the concrete spiral a removable bearing member 27 which is located in position during assembly of the guide mechanism with the blade-shaft 26.

The embodiment of Figures 2 and 3 can, of course, be used only if there is sufficient space between the upper and lower edges of the guide vanes to permit assembly of the runner. According to Figure 5, at the level of the lower guide vane edge, there is built a platform 28 for supporting the runner hub 3 and from which the individual runner vanes 4 can be inserted in the hub. In this position the shaft 6 can also be set on the runner hub and coupled to it. The bearing collar can also be built in so that later the entire apparatus can be lowered into its correct position after removal of the assembly platform 28.

A lower grid 29 likewise serves to facilitate assembly of the smaller runner parts in that they can be held there before the runner hub is lowered. This grid 29 further facilitates the periodic runner inspections.

Whilst the blade 4 is assembled with the help of a special temporary suspension 30, the smaller runner parts can be positioned with the powerhouse crane. To this end a cable 31 and hook 32 are provided passing through the hollow turbine shaft 6. If a higher space is required for assembly it would be possible to arrange the assembly platform 28 somewhat lower in the bore of the throat ring.

What is claimed is:

1. In an hydro-electric power plant including a generator, a vaned runner of the propeller type which turns on a vertical axis and has a central hub and adjustable lateral extending vanes, a drive shaft connecting the runner with the generator, and means for feeding a coaxially whirling body of water against the upstream faces of said vanes to cause rotation of said runner, said means including a spiral chamber and adjustable guide vanes that are mounted on rotatable shafts whose axes are arranged in a circle around the turbine axis, the improvement which comprises a monolithic concrete housing enclosing said spiral chamber and having an inward projecting collar which is axially adjacent the adjustable guide vanes and which defines a central opening whose diameter is smaller than the diameter of said guide vane circle, the collar being positioned below the generator so that the drive shaft extends through said central opening; an annular series of openings formed in the collar, there being one opening aligned with each of said rotatable shafts; and bearings for said rotatable shafts located within said openings.

2. The improvement defined in claim 1 in which the diameter of the central opening of said concrete collar is larger than the outer diameter of the runner vanes.

3. In an hydro-electric power plant including a generator, a vaned runner of the propeller type which turns on a vertical axis and has a central hub and adjustable lateral extending vanes, a drive shaft connecting the runner with the generator, and means for feeding a coaxially whirling body of water against the upstream faces of said vanes to cause rotation of said runner, said means including a spiral chamber and adjustable guide vanes that are mounted on rotatable shafts whose axes are arranged in a circle around the turbine axis, the improvement which comprises a monolithic concrete housing enclosing said spiral chamber and having an inward projecting collar which is axially adjacent the adjustable guide vanes and which defines a central opening whose diameter is smaller than the diameter of said guide vane circle and the outer diameter of the runner vanes but larger than the diameter of the runner hub and longest profile length of the runner vanes, the collar being positioned below the generator so that the drive shaft extends through said central opening; an annular series of openings formed in the collar, there being one opening aligned with each of said rotatable shafts; and bearings for said rotatable shafts located within said openings.

4. The improvement defined in claim 3 in which the collar encloses an annular cavity; and including means mounted in said anular cavity for adjusting the positions of said rotatable shafts to thereby vary the pitch of the guide vanes.

5. The improvement defined in claim 4 including a thrust bearing carried by the collar and supporting the turbine runner.

References Cited in the file of this patent

UNITED STATES PATENTS

| 2,077,883 | Hand | Apr. 20, 1937 |
| 2,701,313 | Obrist | Feb. 1, 1955 |
| 2,733,892 | Peyrin et al. | Feb. 7, 1956 |

FOREIGN PATENTS

| 63,149 | France | Mar. 16, 1955 |
| 174,581 | Austria | Apr. 10, 1953 |
| 1,055,531 | France | Oct. 14, 1953 |
| 80,734 | Switzerland | Aug. 1, 1919 |